(12) United States Patent
Grace et al.

(10) Patent No.: US 7,143,159 B1
(45) Date of Patent: Nov. 28, 2006

(54) METHOD FOR CORRELATING AND PRESENTING NETWORK MANAGEMENT DATA

(75) Inventors: Jennifer Lynn Grace, San Jose, CA (US); Ron Vered, Sunnyvale, CA (US); Arevig Antablian, Saratoga, CA (US)

(73) Assignee: 3Com Corporation, Santa Clara, CA (US)

( * ) Notice: Subject to any disclaimer, the term of this patent is extended or adjusted under 35 U.S.C. 154(b) by 872 days.

(21) Appl. No.: 09/732,991

(22) Filed: Mar. 12, 2001

(51) Int. Cl.
*G06F 15/173* (2006.01)

(52) U.S. Cl. ............... 709/224; 709/201; 709/217; 709/218; 709/219; 709/223; 715/853

(58) Field of Classification Search ........... 709/224, 709/200, 203, 217, 218, 219, 223, 201; 707/10, 707/103 R; 345/853; 715/854, 853; 717/105
See application file for complete search history.

(56) References Cited

U.S. PATENT DOCUMENTS 5,295,244 A * 3/1994 Dev et al. ............... 345/853
5,878,420 A * 3/1999 de la Salle ............... 707/10
6,085,243 A   7/2000 Fletcher et al.
6,151,023 A * 11/2000 Chari ............... 715/854
6,286,129 B1 * 9/2001 Agarwal et al. ............ 717/105
6,604,112 B1 * 8/2003 Taylor ............... 707/103 R

OTHER PUBLICATIONS

RMON2 Receives IETF RFC Standard Number, Sep. 19, 2000, Printout from 3Com website www.3com.com/nsc/501313.html.

* cited by examiner

*Primary Examiner*—Ario Etienne
*Assistant Examiner*—Yves Dalencourt
(74) *Attorney, Agent, or Firm*—John Carpenter; Reed Smith, LLP

(57) ABSTRACT

NIC collected network statistics are captured by agent devices resident on Host machines of a network. A probe (software or hardware) retrieves the collected statistics from one or more monitored hosts (each host on the network, for example) and places them in RMON MIB and RMON extension MIB formats. The MIB data is retrieved by queries from a data correlation device that then correlates the queried data into useful statistics regarding network traffic. The useful statistics include network traffic in bytes per second for each application, application protocol, hosts, user logon id, etc. for each of the monitored hosts. Different views including a host to host matrix view are provided in a split window display.

28 Claims, 13 Drawing Sheets

| OSI | | | | | | TCP/IP |
|---|---|---|---|---|---|---|
| Application | SMB | | | | | Application |
| Presentation | | | | | | |
| Session | NetBIOS | NetBEUI | NetBIOS | NetBIOS | | |
| Transport | IPX[1] | | DECnet | TCP&UDP | TCP/UDP | |
| Network | | | | IP | IP | |
| Link | 802.2, 802.3, 802.5 | 802.2 | Ethernet V2 | Ethernet V2 | Ethernet or others | |
| | | 802.3, 802.5 | | | | |
| Physical | | | | | | |

Fig. 2

METHOD FOR CORRELATING AND PRESENTING NETWORK MANAGEMENT DATA

BACKGROUND OF THE INVENTION

1. Field of Invention

This invention relates generally to network management. The invention is more specifically related to a presenting data about network operations and performance in a network administrator friendly format.

2. Discussion of Background

Networks have become important, strategic foundations for competing in a global economy. And every day, more users and more business activities step into the network realm. Users are demanding that access to the network be delivered with the same simplicity, reliability, quality, and flexibility associated with picking up a phone and calling anywhere in the world.

In this network-centric environment, the behind-the-scenes designers and operators of networks face three concurrent challenges:

Networks are growing larger and more dispersed. With each new user comes another PC, many of them notebooks and a growing number are scattered to remote locations, users' home offices, or all corners of the earth in the hands of mobile workers. While the initial capital cost of PCs gets a lot of attention, the greatest chunk of technology budgets goes to maintaining and managing users' connections. Lowering total cost of ownership (TCO) for a growing PC population means finding a way to simplify and automate management and troubleshooting of desktops, servers, and mobile PCs spread across the business. It also means enhancing the fault tolerance of servers so IS staffs escape the need to constantly fine-tune performance or deal with emergencies.

Networks are growing more complex. New technologies and applications are reaching into corporate networks at an accelerating pace. More users and greedier applications are competing for bandwidth. Fully switched local networks are common. Consequently, it is growing more difficult to monitor performance and pinpoint problems. The terminal-to-host model is long gone, and even the relatively predictable shape and behavior of client-server environments has given way to the more fluid and "fractal" connections that support intranets, Internet connectivity, multimedia, and other emerging applications. It is essential to gain increased visibility into today's complex networks.

Networks are growing more critical. Businesses are using information technology as a competitive advantage. And those that are getting the strongest return on their investment are graduating from e-mail and office applications to business-critical, production applications-process controls, customer service, medical imaging, e-commerce and others. In these situations, near-100-percent network availability is essential—the days of overnight outages lasting up to several hours are over.

Along with this need for nonstop networks comes a need for greater control over, and information about, how traffic moves through the network. Companies are deploying applications such as enterprise resource planning (ERP), sales automation, e-commerce, distributed training, and voice-over-IP (VoIP) at a rapid pace. This business-critical and, in the case of voice and video, delay-sensitive traffic needs to move through the network unobstructed by lower-priority activities such as e-mail or Internet browsing.

Therefore, IS managers need tools capable of providing network support for these critical business objectives on an immediate real time basis. The supporting information is preferably provided in an intuitive format that allows the managers to quickly find the needed information with simple searching and a minimum of additional research. However, because of display complexities, and lack of available tools, the data presented to IS managers is not presented as effectively as is preferred to allow quick and easy access to the data needed for making proper network management decisions.

Various network monitoring tools currently utilized to inform managers about the health of networks are know. A brief discussion of network devices, standards, the traffic crossing these networks, and some an available tools is now provided.

Networking Devices Standards

This specification presumes familiarity with the general concepts, protocols, and devices currently used in LAN networking applications and in WAN internetworking applications. These standards are publicly available and discussed in more detail in the above referenced and other co-assigned patent applications.

This specification also presumes some familiarity with the specific network and operating system components discussed briefly in the following paragraphs, such as the simple network management protocol (SNMP) for management of LAN and WAN networks, and the RMON MIBs defined for remote network monitoring and management. For additional information regarding MIBs, the reader is referred to RFC 1213.

General Network Topology

Local area networks (LANs) are arrangements of various hardware and software elements that operate together to allow a number of digital devices to exchange data within the LAN and also may include internet connections to external wide area networks (WANs). FIG. 1 is a diagram representing a typical modern LAN 100 comprised of one to many Hosts or End Systems (ESs) such as hosts 1 . . . n that are responsible for data transmission throughout the LAN. The ESs may be familiar end-user data processing equipment such as personal computers, workstations, and printers and additionally may be digital devices such as digital telephones or real-time video displays. Different types of ESs can operate together on the same LAN. In FIG. 1, the hosts 1 . . . n are on a ring type LAN having a server/bridge/router device 130, also referred to as an Intermediate System (IS), that serves various network functions for the LAN 100, and administers each of a bridge to an attached LAN 160 and a router to a Wide Area Network (WAN) 190. However, modern networks may be composed of any number of hosts, bridges, switches, hubs, routers, and other network devices, and may be configured as any one or more of ring, star, and other configurations.

Packets

In a LAN such as 100, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets.

Layers

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 2 illustrates various examples of layered network standards having a number of layers. Corresponding levels of the various network standards are shown adjacent to each other and the OSI layers, which are referred to herein as: the Physical Layer, the Data Link Layer, the Routing Layer, the Transport Layer, the Session Layer, the Presentation Layer and the Application Layer, are also shown for reference. Please note the TCP/IP protocol layers shown.

Generally, when an ES is communicating over a network using a layered protocol, a different software module may be running on the ES at each of the different layers in order to handle network functions at that layer.

Drivers and Adapters

Each of the ISs and ESs in FIG. 1 includes one or more adapters and a set of drivers. An adaptor generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adaptor software operating in one type of network ES is generally referred to as a NIC (Network Interface Card) driver. A NIC driver is layer 2 software designed to be tightly coupled to and integrated with the adaptor hardware at the adaptor interface (layer 1) and is also designed to provide a standardized interface between layer 2 and 3. Ideally, NIC drivers are small and are designed so that even in an ES with a large amount of installed network software, new adaptor hardware can be substituted with a new NIC driver, and all other ES software can continue to access the network without modification.

NIC drivers communicate through one of several available NIC driver interfaces to higher layer network protocols. Examples of NIC driver interface specifications are NDIS (Network Driver Interface Specification developed by Microsoft and 3Com) and ODI (Open Data-Link Interface developed by Apple Computer and Novell).

Generally, when an ES is booting up and begins building its stack of network protocol software, the NIC driver loads first and tends to be more robust than other network software modules because of its limited functions and because it is tightly designed to work with a particular hardware adaptor.

Management and Monitoring of ESs

A network such as that shown in FIG. 1 is generally managed and monitored within an enterprise by an Information Services (IS) Department (ISD), and an IS manager, which is responsible for handling all the interconnections and devices shown. The same ISD is generally responsible for managing the applications and system components on each of the individual ESs in the network.

Many prior art systems have been proposed to allow an IS staff person to manage and partially monitor network infrastructure remotely over a network. Such systems include IBM's NetView, HP's OpenView or Novell's Network Management System (NMS). However, these systems generally rely on a full network protocol stack to be correctly running effectively on the remote ES in order to accomplish any remote file management operations.

Simple Network Management Protocol (SNMP)

A common protocol used for managing network infrastructure over the network is the Simple Network Management Protocol (SNMP). SNMP is a layer 7 network and system management protocol that handles network and system management functions and can be implemented as a driver (or SNMP agent) interfacing through UDP or some other layer 4 protocol. Prior art SNMP installations largely were not placed in ESs because SNMP did not handle ES management or monitoring functions and because SNMP agents are processor and memory intensive.

SNMP is designed to provide a simple but powerful cross platform protocol for communicating complex data structures important to network infrastructure management. However, its power and platform-independent design makes it computationally intensive to implement, and for that reason it has limited applications in end system management or monitoring. It is primarily used in network infrastructure management, such as management of network routers and bridges.

SNMP is designed to support the exchange of Management Information Base (MIB) objects through use of two simple verbs, get and set. MIB objects can be control structures, such as a retry counter in an adaptor. Get can get the current value of the MIB and set can change it. While the SNMP protocol is simple, the MIB definitions can be difficult to implement because MIB ids use complex data structures which create cross-platform complexities. SNMP has to translate these complex MIB definitions into ASN.1 which is a cross-platform language.

Even if installed in an ES, an SNMP agent cannot be used to manage or diagnose an ES or update system components where the UDP protocol stack is not working properly, which will often be the case when the network connection is failing. When working, SNMP provides a protocol interface for higher layer prior art management applications.

SNMP is described in detail in a number of standard reference works. The wide adoption of SNMP throughout the networking industry has made compatibility with SNMP an important aspect of new management and monitoring tools. For additional information regarding SNMP, the reader is refferred to RFC 1905.

RMON Overview

Remote Monitoring (RMON) technology is a set of software and hardware specifications designed to facilitate the monitoring and reporting of data traffic statistics in a local area network (LAN) or wide area network (WAN). RMON was originally defined by the IETF (Internet Engineering Task Force) in 1991. RMON defined an independent network probe, which was generally implemented as a separate CPU-based system residing on the monitored network. Software running on the probe and associated machines provided the various functions described by the defining IETF RFC documents, RFC-1271, RFC-1513 and RFC-1757.

According to the original standards, a special application program, sometimes referred to as an RMON Manager, controlled the operation of the probe and collected the statistics and data captured by the probe. In order to track network traffic and perform commands issued to it by the RMON Manager, a prior art probe operated in a promiscuous mode, where it read every packet transmitted on network segments to which it was connected. The probe performed analyses or stored packets as requested by the RMON Manager.

RMON builds upon the earlier Simple Network Management Protocol (SNMP) technology while offering four advantages over SNMP agent-based solutions:

(1) RMON provides autonomous Network Management/Monitoring, unlike SNMP which required periodic polling of ESs. RMON stand-alone probes are constantly on duty and only require communication with a management application when a user wishes to access information kept at the probe.

(2) RMON's alarm capability and user-programmable event triggers furnish a user with asynchronous notification of network events without polling ESs. This reduces the network bandwidth used and allows across-WAN links without concern for performance costs.

(3) RMON automatically tracks network traffic volume and errors for each ES MAC address seen on a segment and maintains a Host Matrix table of MAC address pairs that have exchanged packets and the traffic volume and errors associated with those address pairs.

(4) RMON permits the collection and maintenance of historical network performance metrics thereby facilitating trend analysis and proactive performance monitoring.

(5) RMON includes fairly sophisticated packet filter and capture capabilities which allowed a user to collect important network packet exchanges and analyze them at the management console.

The new capabilities of RMON were quickly appreciated and RMON probes soon became the preferred choice for remote monitoring. It has become common place for ISs, particularly hubs and switch/bridges to embed RMON probe functions.

For additional information regarding RMON, the reader is referred to RFC's 2021, 2819, 2895, and 1902.

RMON2

Shortly after adoption of RMON, users wanted more management information than the layer 2 statistics RMON provided. In particular, network managers wanted to track higher layer protocols and the sessions based upon those protocols to learn which applications were using which protocols at what expense in available network bandwidth. Therefore, a new version of RMON, RMON2 was developed to provide more advanced capabilities. RMON2 provides network header layer (layer 3) through application layer (layer 7) monitoring for a number of commonly used protocols and applications, including the Internet protocol suite (IP and UDP) and Internet applications (FTP, Telnet, TCP and SNMP).

Limitations of IS-Based (Hub-Based/Switch-Based RMON)

A traditional stand-alone RMON probe, connected to a switch like any other host device, only sees network traffic flowing on the segments to which it is connected, greatly limiting its usefulness in modern, more complicated network topologies. One solution is to place the RMON probe within the switch itself and have it monitor all ports simultaneously. However, this requires considerable processing capability in order to handle the large bandwidth made possible by modern switching architectures.

In a conventional 10 Mb Ethernet or 4/16 Mb Token Ring environment, a stand-alone RMON probe on a single network segment could usually be implemented on a 486-class processor. However, where multiple network interfaces must be monitored or where network bandwidths are higher, (such as with 100Base-T LANs or switching hubs/ATM), it is considerably more costly to build a probe with sufficient processing power to capture all, or even most, of the network packets being exchanged. Independent laboratory tests show that RMON products claiming to keep up with higher bandwidth network traffic generally cannot, in fact, keep up with all data flow during peak network rates. The situation worsens considerably when attempting to do RMON2 analysis of network packets in high bandwidth environments. Processing power required can be easily five times greater than needed to simply capture packets, and data storage requirements can easily increase ten fold.

Use of filtering switches and hubs (discussed in the above referenced patent applications) in networks further limits the usefulness of probes because, unlike repeaters, not all the packets appear at every output port of the switch. This makes the use of external stand-alone probes infeasible unless the switch vendor has provided a monitor port (sometimes called a copy port) where all packets are repeated to the external RMON probe. However, this approach decreases data traffic performance in the switch, and does nothing to reduce the processing overhead required of the probe.

In general, the RMON and RMON2 standards fail to provide all the information needed by IS managers for efficient network management. This functionality would need to be implemented in a LAN/WAN without unduly harming network performance and not requiring additional expensive network hardware to support. In addition, network data needs to be presented to the IS managers in an efficient manner.

SUMMARY OF THE INVENTION

The present inventors have realized that the need for more detailed network monitoring may be accomplished via monitoring sources of network traffic. The present invention gathers data describing the network traffic using RMON standard and RMON extension MIBs and correlates the data to determine useful statistics about the traffic (application originating the traffic, protocols utilized, etc.), and provide a useful display of the traffic and protocols.

The present inventors have also realized that an effective method for presenting Network management data is via a split window display. The split window display includes two windows, each with scrolling capability, selection buttons for varying a view presented in the windows, and a search utility to pinpoint user specified data instances in the network management data. The split window display presents high level network data in a first window using an expandable/collapsible tree format. Detailed information regarding a selected portion of the high level data is displayed in a second window. Various views of the network data can be shown via the selection buttons, and include an Application Protocols, Network Protocol, Hosts, Matrix, and Applications views.

The present invention may be embodied as a method of presenting network data, comprising the steps of, retrieving network data, and displaying the network data in a split window display. The step of displaying may include the steps of, displaying high level portions of the network data in a selectable format in a first window of said split window display, and displaying details of a high level portion of network data selected in said first window in a second window of said split window display.

The present invention may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of various examples of layered network standards having a number of layers;

DESCRIPTION OF THE PREFERRED EMBODIMENTS

The RMON standard provides the capability for extension MIBs (Management Information Base—a structured collection of managed objects. A standard for correlating data collected from network traffic). MIB data retrieved from the network traffic is stored in one of an RMON standard MIB or an extension MIB. An LAN agent or driver working in conjunction with a Network Interface Console (NIC) retrieves the data from the network traffic and builds the MIB.

Figure 3:
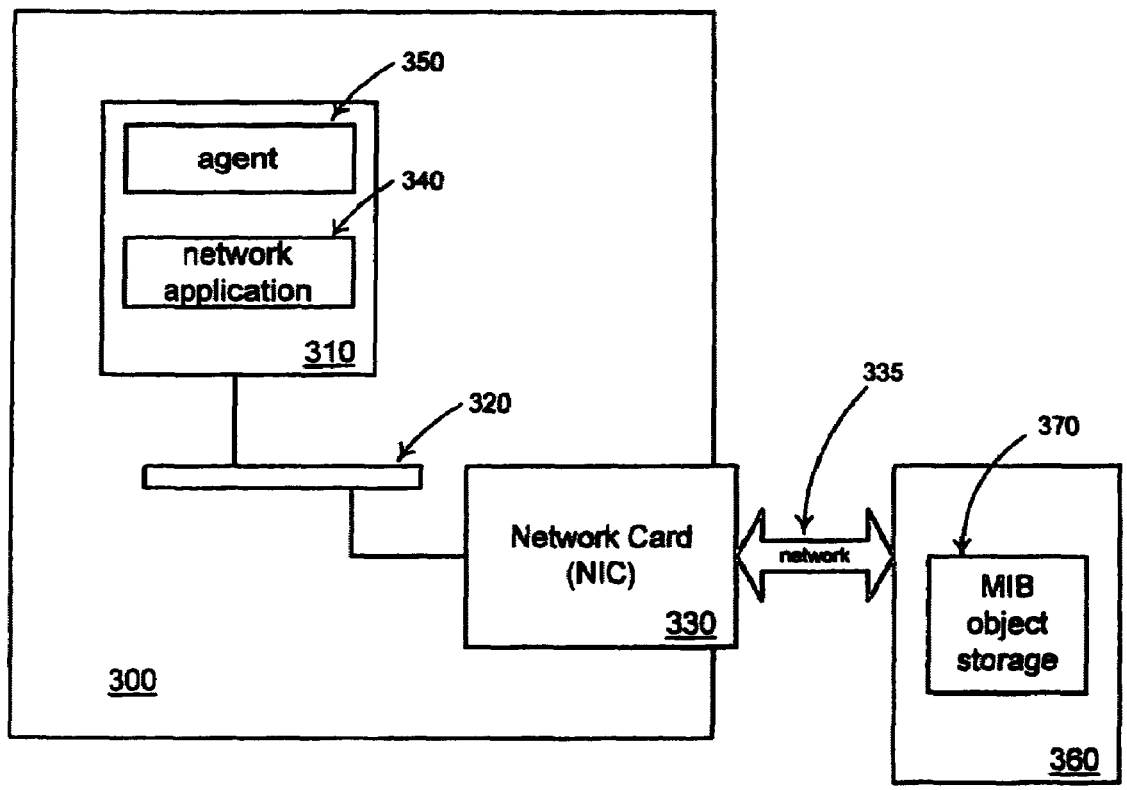
FIG. 3 is a block diagram of selected components and communications of a host device according to the present invention.

Referring again to the drawings, wherein like reference numerals designate identical or corresponding parts, and more particularly to FIG. 3 thereof, there is illustrated a block diagram of selected components and communications of a host device 300. The host device 300 includes a Central Processing Unit (CPU) 310, a system bus 320, and a Network Interface Console (NIC or Network Card) 330. The NIC 330 receives packets (TCP/IP packets, for example) off bus 320, placing them on the network 335. The NIC 330 receives packets from the network 335 and places them on the bus 320 enroute to a protocol stack and a destination application (network application 340, for example).

The NIC 330 collects network statistics from packets sent and received. The network statistics include information such as packet sizes, number of packets, bytes transmitted, etc. Other information, including data regarding packet source and destination hosts is also collected. A LAN agent 350 (executed on CPU 310, or resident in the NIC, for example) retrieves the network statistics from the NIC and places them in MIB format.

The LAN agent 350 retrieved statistics are provided to each of RMON standard MIB and extension MIB objects. The MIB objects may be located in a storage device (not shown) on host 300, or in a storage object, MIB object 370, on another host 360 on the network. A management program may be employed on the other host 360 to receive messages from the agent 350 containing the MIB statistics and place them in the MIB object 370. The MIB object 370 is then available for queries via a query language or other mechanisms (SNMP gets, for example).

Figure 4:
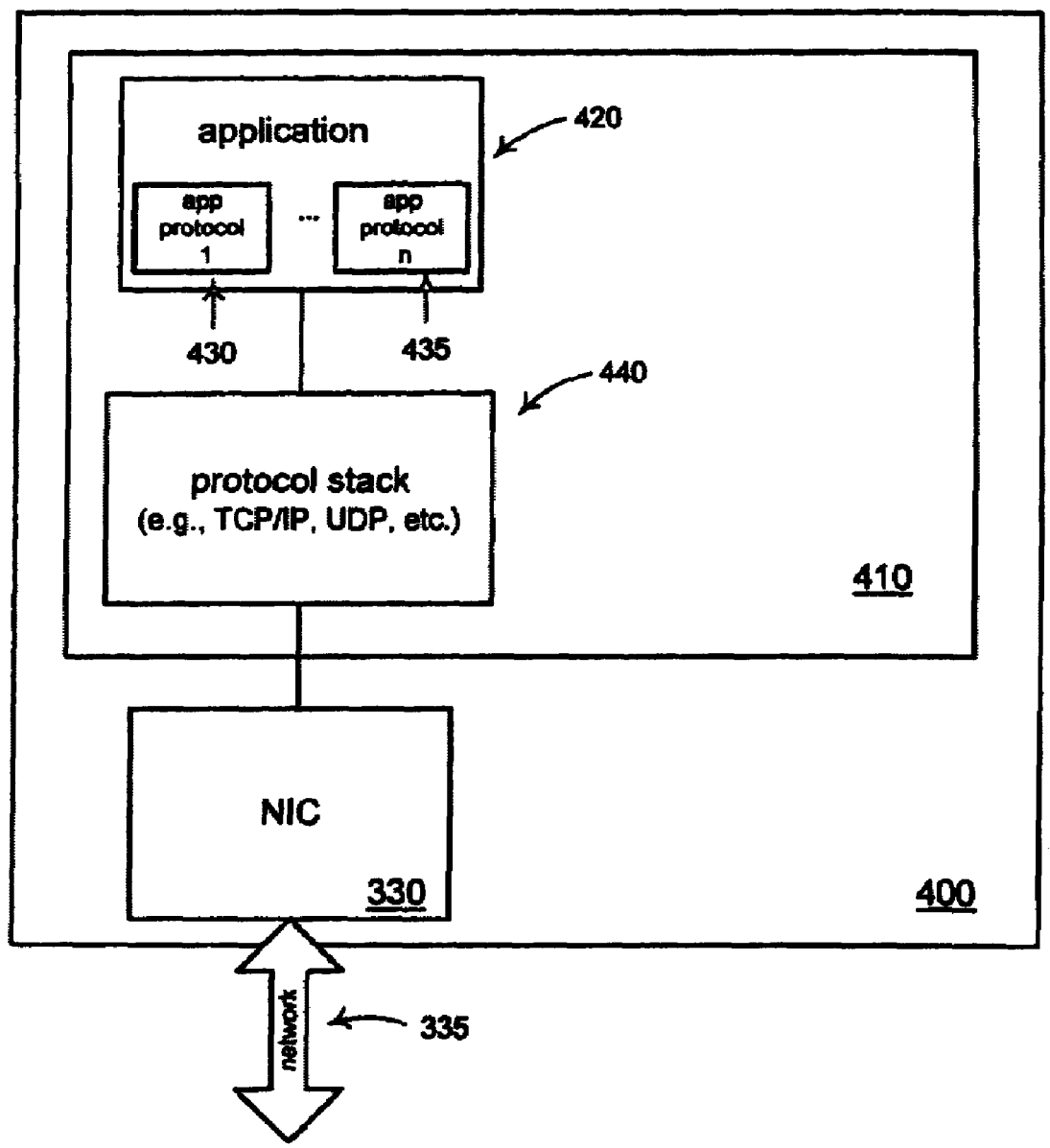
FIG. 4 is a block diagram of an application and protocol stack executing on a CPU of a host device according to the present invention.

FIG. 4 is a block diagram of an application 420 and protocol stack 440 executing on a CPU of a host device. The application is, for example, Internet Explorer. Other instances of Internet Explorer or other applications that generate network traffic may also be concurrently executing on the host device 400. The protocol stack 440 is a TCP/IP protocol stack, but may be any of TCP/IP, UDP, or other protocols, which may also be executing concurrently.

The application (420, for example) utilizes one or more application protocols (1 . . . n, ftp 430, http-www 435, TELNET, smb, nbt_session, nbt_data, etc, for example). The application protocol(s) is a protocol used by the application to communicate with applications on other hosts. For example, when a user, logged on to host 400, initiates (types a URL, or clicks a hyperlink, for example) an http request via a browser application, an http URL request is constructed and sent to a server application, normally located on a remote host. The application protocol http request is then sent to the protocol stack for packaging as a packet, and the packet is sent to the NIC 330 to be communicated over the network 335. Packets returned by the remote host in response to the http request undergo a reverse process, network transmitted response packets are detected by the NIC, which retrieves and passes the packets to the protocol stack which then recovers the http response, forwarding it to the browser application.

The LAN agent 350 collects data by viewing packets that pass through the NIC and constructs MIBs from the NIC 330. The data collected by the agent relates to each aspect of network data traffic formation and transmission, including, users log-in information, host information, application information, and network protocol information (relating to the protocol stack(s)). Other data collected may not be specifically related to the above data, but is linked, or links, different aspects of one type of data to another (ultimately used for cross referencing MIB tables or data points).

The agent 350 then formats the collected network traffic data into data packets and forwards the packets to a managing device (other host 360, a Network Performance Monitor (NPM) (e.g., a software RMON Probe), for example). The managing device collects similar data packets from each monitored host on the network. Data in the collected packets are then formatted as a set of MIBs (MIB objects) having an overall view of all monitored network traffic. The MIB objects are then stored in MIB object storage 370.

The present invention utilizes both RMON standard and extension MIBs to collect and store network traffic data to provide users (network managers, network technicians, etc) with a highly relevant picture of network traffic volumes and flow. The reason extension MIBs are utilized is because the network traffic creates data that is needed to determine the displays to be presented, and there is no place in the standard MIB to put it. For example, not all system information is stored in the RMON std MIBs, and the system information is needed for correlating the IP addresses to the login and username of the user creating network traffic, so an extension MIB is creating having system information.

The data presented to the network managers is retrieved from the RMON standard and extension MIBs, using the various tables, correlating data between the various tables and builds a map for each piece of network traffic. The correlations performed include correlating network packets to their origination and destination hosts, and to a users login id. For example, the RMON1 standard lists host information by MAC addresses, and the RMON2 standard lists host information via IP addresses (and includes a table for cross-referencing IP adresses to MAC addresses). The 3Com proprietary RMON extension MIBs map IP addresses to the login and then the username of the user running the host application originating or receiving the particular piece of network traffic.

Table 1A is an example portion of an expanded RMON tree with a Statistics group highlighted.

TABLE 1A

```
iso
  org
    dod
      internet
        mgmt
          mib-2
            system
            interfaces
            at
            ip
            icmp
            tcp
            udp
            egp
            transmission
            snmp
            rmon
              statistics
                etherStatsTable
                tokenRingMLStatsTable
                tokenRingPStatsTable
                etherStats2Table
                tokenRingMLStats2Table
                tokenRingPStats2Table
              history
              alarm
              hosts
              hostTopN
              matrix
              filter
              capture
              event
              tokenring
              protocolDir
              .
              .
              .
```

Table 1B illustrates an example get done on the etherStatsTable under the statistics group of Table 1.

```
statistics
  etherStatsTable
    etherStatsIndex.1        INTEGER: 1
    etherStatsIndex.2        INTEGER: 2
    etherStatsDataSource.1   OBJECT IDENTIFIER::
                             1.3.6.1.2.1.2.2.1.1.1
    etherStatsDataSource.2   OBJECT IDENTIFIER::
                             1.3.6.1.2.1.2.2.1.1.2
    etherStatsDropEvents.1   COUNTER: 0
    etherStatsDropEvents.2   COUNTER: 0
    etherStatsOctets.1       COUNTER: 1838729611
    etherStatsOctets.2       COUNTER: 2570328254
    .                        .
    .                        .
    .                        .
```

Table 2 is an example portion of an RMON Extension MIB.

TABLE 2A

```
iso
  org
    dod
      internet
        mgmt
          mib-2
            system
            interfaces
            at
            ip
            icmp
            tcp
            udp
            egp
            transmission
            snmp
            rmon
            dot1dBridge
            snmpDot3RptrMgt
            host
        private
          enterprises
            nat
            natTM
            hp
            tecElite
            sync
            a3Com
              edgemonitor
                setup
                hlResponseTime
                realNIC
                .
                .
                .
```

Table 2B is an example portion of an RMON Extension MIB of Table 2A illustrating details of the a3Com group.

TABLE 2B

```
A3Com
  edgemonitor
    sys
      process
        processSummaryTable
          processSummaryNumber.       INTEGER: 14
          1.6.0.96.8.176.52.111
          processSummaryNumber.       INTEGER: 24
          2.6.0.96.8.191.104.167
          processSummaryNumber.       INTEGER: 19
          2.6.0.192.79.151.175.165
```

TABLE 2B-continued

A3Com

| | |
|---|---|
| processIndex.<br>1.6.0.96.8.176.52.111.2 | COUNTER: 2 |
| . . | |
| . . | |

In some cases, data is determined directly from either the RMON standard or extension MIB (Level 1 on the Matrixes view comes straight from the Host MIB, alternatively, Level 1 comes from the matrix table, after removing duplicate entries). However, in the present invention, normally, the objects must be searched by correlating data from across the various data points and tables in the MIBs. For example, using the example portions, user data may be determined by correlating objects of the example RMON standard MIB with tables of the extension MIB, vice versa, or any combination thereof to reach the desired statistic or value.

Table 3 provides an example correlating RMON MIBs for correlating RMON standard MIB and 3Com proprietary MIBs to determine the data displayed as discussed herein. The term correlating as used herein comprises the processes of searching and reading rows of RMON (or other data) tables, getting result sets, performing joins, associations, and relational or other operations performed on or with the data to deterine a desired result. The instructions presented in Table 3 are one example, other implementations of querying the MIB data to determine these and other useful statistics will be apparent based on the present disclosure.

TABLE 3

Application Protocol

MIB's used: Protocol Distribution, Protocol Directory, and AlHost.
Protocol Directory provides a link between the protocolIndex and the Protocol description.
Every Protocol Distribution table OID contains both Application and Network layer protocol Identifiers (i.e. you can extract this data from the indices into this table)
These OID's are used for Level 1 and Level 2.
Level 1 - Is the Application layer protocols sorted in descending rate order.
Level 2 - Is the Network layer protocols sorted in descending rate order. This OID structure implies that an Application can use several Network protocols for it transport.
Rate Calculation for Level 1 and Level 2 is done by calculating the difference between two absolute values retrieved from the Protocol Distribution table in two successive polls. A two level cache has an entry per Application protocol and Rate, and contains a list of entries per Network protocol in conjunction with their Rates.
Level 3 - Is the list of entries from the Alhost table with the specific Application identifier listed in level 1.
Rate for Level 3 is calculated in much the same way as above except from
the Alhost table. A single level cache holds the protocol identifier, host list, Rates and Absolute values.
Hosts MIB's used: HostTopN, NlHost, AlHost, and AddressMap.
HostTopN we get a list of physical Address in descending rate order.
AddressMap translates Network Address to physical address.
Level 1 - will show this HostTopN information with the addition of AddressMap translation . . .
Level 2 - will use every network address from level 1 as an index into NlHost, to retrieve the network rate information.
Level 3 - will use every network address from level 1 as an index into AlHost, to retrieve the application rate information. Rate for Level 3 is calculated the same as level 3 above.
Data for Level 3 and Level 2 is cached in a single level cache containing data retrieved from AlHost and NlHost TABLE 3-continued Matrix MIB's used: Matrix and Host
Level 1 - Host list with the Out Octets from the Host table.
Level 2 - Is the Destination Addresses listed in the Matrix with Level 1's Address as the Source Address with the out octets straight from the table.
Applications MIB's used: Proprietary Response Time Tables (i.e. AppTable, AlResponseTimeApp)
All levels use the OID from the AlResponseTimeApp table which contains application index, network protocol, destination address and source address.
Level 1 - Is the application name retrieved from the AppTable using the application index above and the sum of the rates from subsequent levels (Rates retrieved from AlResponseTimeApp table)
Level 2 - Is the name of the network protocol based on the network protocol index in the OID and the sum of the rates from subsequent levels.
Level 3 - Is the destination network address list and the sum of the rates from subsequent levels.
Level 4 - Is the source network address list with the rate information retrieved from the AlResponseTimeApp.
Every level is sorted in descending rate otder.
All of the above trees have addresses that get resolved to their login Name and Machine address (only on the machines that have a Lam agent installed)
The resolution is done as follows:
MIB's used: Proprietary Sys Table, specifically the machine and user tables.
The Physical Address (MAC Address) is used to retrieve the machine name from the machineName column of the machine table.
The Physical Address (MAC Address) is used to retrieve the user login from the userName column of the user table.

Correlations for the above views utilize caching techniques for sorting. One example caching technique is disclosed in co-filed, and co-pending U.S. patent application entitled "Method and Architecture for a High Performance Cache for Distributed, Web-Based Management Solutions," Ser. No. 09/732,977, filed Dec. 8, 2000, which is now U.S. Pat. No. 6,954,786. Inventor(s): Ron Vered, et al. the contents of which are incorporated herein by reference in their entirety.

Appendixes of this disclosure contain example extension MIBs are utilized in conjunction with an embodiment of the present invention.

Figure 5A:
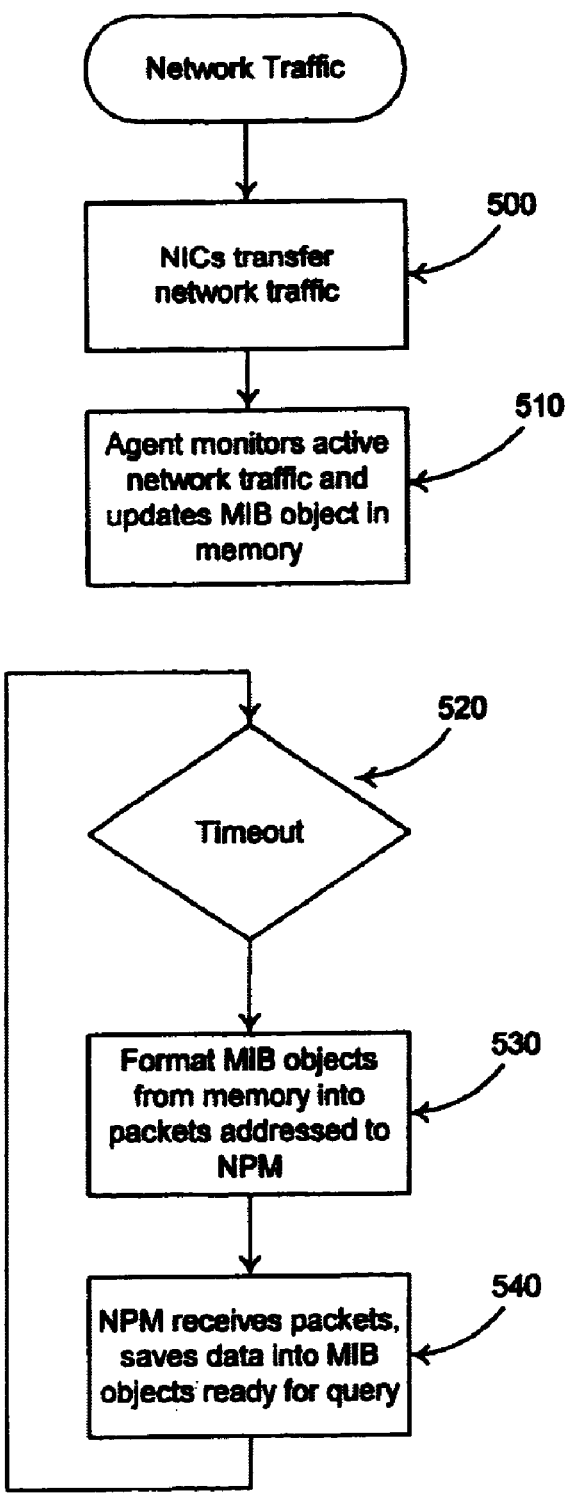
FIG. 5A is a flow chart illustrating NIC data collection and MIB object/extension object creation according to the present invention.

FIG. 5A is a flow chart illustrating NIC data collection and MIB object/extension object creation according to the present invention. Network traffic is assumed, and at step 500, the NICs on the network send and receive network traffic for the host to which they are attached. The agents (one per host machine) monitors the active network traffic going through the NICs and updates a local MIB object maintained in memory on the Host machine (step 510). The agent monitors network traffic on each NIC device installed in the machine where the agent is installed (i.e., there may be multiple NICs on any one machine, but only one agent is required). The agent is a software program that executes on the cpu of the host machine and is at the same network layer as the NIC driver. The agent is referred to as Wedge technology because it resides between the NIC and the protocol stack. The agent is configured to monitor the network traffic from any industry standard NIC device and support creation of local MIB objects corresponding to RMON standard and the proprietary MIBs supporting the network data collection and correlation operations discussed herein. However, other extension MIBs supporting the processes and techniques of the present invention may also be produced, and the present invention is not intended to be limited by any specific RMON standard or extension MIBs, except as claimed otherwise in the appended claims.

Continuing in FIG. 5A, at step 520, a timeout occurs that signals the agent to retrieve it's local MIB object, package it into packets and transmit the packets to a NPM device. The timeout may take various forms. In one embodiment, the time out is generated after receipt of one of an IP/IPX directed broadcast or multicast communication sent to each monitored host. The IP/IPX communication may be broken into segments, each segmented polling a specific set or range of IP addresses. The IP/IPX communication is a polling mechanism signaling the agent to send it's collected data to a Network Performance Monitor (NPM). The polling is preferably performed at user selectable intervals between 30 seconds and 10 minutes for average corporate sized networks. After receipt of the IP/IPX communication, each monitored host kicks off a timer set with a random generated time out period (random timeout is utilized to keep the NPM from being flooded with simultaneous data packets from each agent on the monitored hosts). In another embodiment, the agents themselves keep a regular timeout period. When the timeout occurs, steps 520–540 occur for each monitored host.

In Step 520, the agent retrieves it's local MIB object and places the MIB data into packets that are sent to the NPM. And, at step 540, the packets received by the NPM are formatted into MIB objects and stored (step 540). The packets received at the NPM are from each monitored host. MIB storage may be in any retrievable location on the network. The stored MIBs contain the overall view of network traffic (combining the individual host views of each local MIB), and are exposed to an interface to allow queries of the data stored in the saved MIB objects (SNMP interface, for example).

Figure 5B:
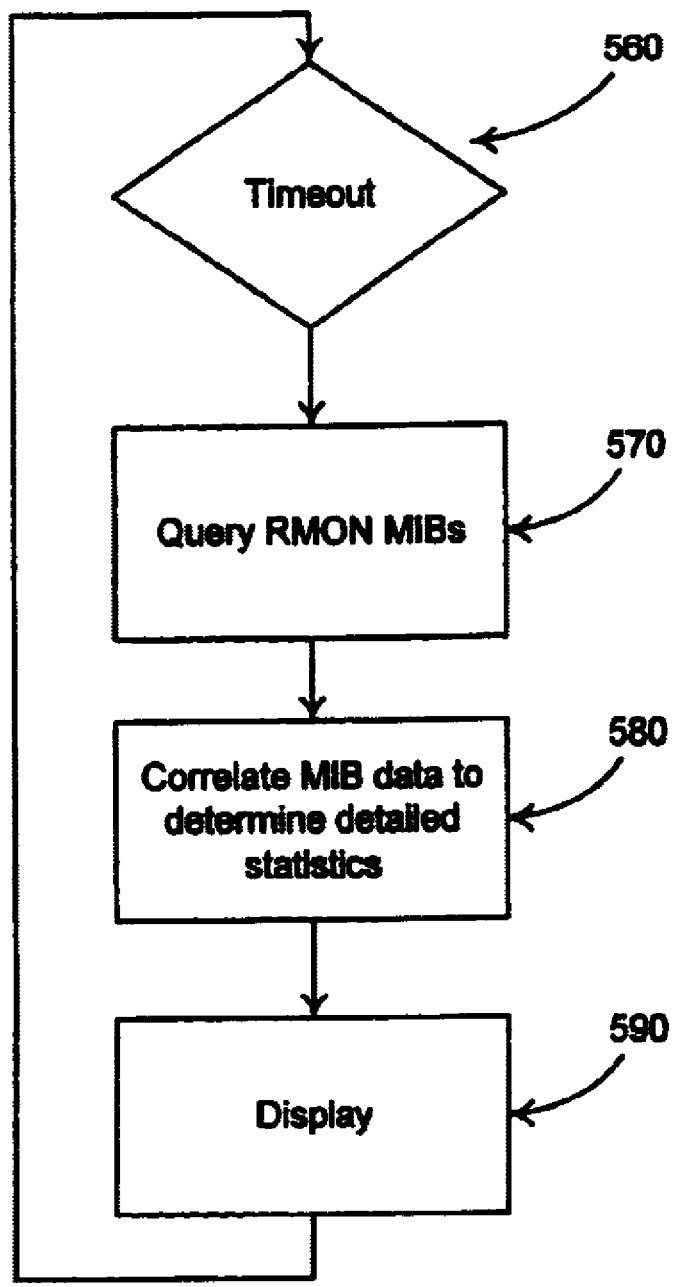
FIG. 5B is a flow chart illustrating MIB object query and data correlation according to the present invention.

FIG. 5B is a flow chart illustrating MIB object query and data correlation according to the present invention. At step 560, a timeout or other event triggering an RMON query occurs (update ping from an end user program, for example). At step 570, a query built by an end user program is made against the stored RMON objects. In one embodiment, the RMON queries are SNMP gets performed on the saved MIB objects. Table 4, provides an example operation that utilizes SNMP get for retrieving MIB object data. In this example, a request is format to retrieve a gettablefunction. The example illustrates how MIB Object Identifiers (MIB OID's) are utilized to access specific data in the MIBs. As with all the example code and operations contained herein, Table 4 is not intended as compilable source or listing of an executable program, but as an example of program flow and is provided as a specific example of one possible implementation of one aspect of the present invention. Therefore, Table 4 should not be used to limit the present invention, other than as claimed in the appended claims.

TABLE 4

```
//This is an example of getting from a MIB table
//the columns and indexes specified from the
//proprietary MIB tables ServerStats and alResponseTime.
//Do a get table
//fill in the List Of MIBOBJ's that you want
m_pLSP->TopNBusiestSList(&pMibObjs, usType);
        unsigned long ultime = CTimeKeep::getInstance( )->getTimeTicks( );
        m_pLSP->TopNBusiestSValList(&pValObjs, ultime);
        //this function call will use our network object to do repeative snmp gets on the mib
        //to return the data requested
        //pCBInfo here is for callback purposes.
        //The pMibObjs list is the list of column objects we are interested in, the pValObjs is
        //the list of index objects we are interested in
        //The network ID is the segment we are interested in
        //The probeIpAddr is the address of the probe we want the data on.
        m_pSNMP->DoGetDataTable(pHeader->GetProbeIpAddr( ), pCBInfo, *pMibObjs, pValObjs,pHeader-
>GetNetworkID( ), true);
        //Below are Functions TopNBusiestSList, TopNBusiestSValList and the constant
        //variable (OID's) needed for this example.
        //----------------------------------------------------------------------------------
        void
        CLSP::TopNBusiestSList (MIBOBJLIST **ppMibObjs, unsigned short usType)
        {
                assert (ppMibObjs != NULL);
                assert (*ppMibObjs == NULL);
                // Allocate memory for the MIB object list.
                *ppMibObjs = new MIBOBJLIST;
                // Create the SiteName MIB object.
                CMIBObject *pName = new CMIBObject (szalResponseTimeDestAddressOid, TYPE_OCTETS);
                (*ppMibObjs)->push_back (pName);
                if(usType == 0)
                {
                    // Create the Resonse Time MIB object.
                    CMIBObject *pResponseTime = new CMIBObject (szalResponseTimeMedianOid,
TYPE_UNSIGNED_LONG);
                    (*ppMibObjs)->push_back (pResponseTime);
                }
```

TABLE 4-continued

```
        else
        {
            // Create the Median Byte Rate MIB object.
            CMIBObject *pHits = new CMIBObject (szalResponseTimeBPSMedianOid,
TYPE_UNSIGNED_LONG);
            (*ppMibObjs)->push_back (pHits);
        }
    }
}
//--------------------------------------------------------------------------------
void
CLSP::TopNBusiestSValList(VALLIST **ppValObjs, unsigned long ultime)
{
    assert (ppValObjs != NULL);
    assert (*ppValObjs == NULL);
    // Allocate memory for the MIB object list.
    *ppValObjs = new VALLIST;
    CAnyValue *pCtrlIndex = new CAnyValue ( );
    (*ppValObjs)->push_back (pCtrlIndex);
    CAnyValue *pTimeMark = new CAnyValue (ultime);
    (*ppValObjs)->push_back (pTimeMark);
    CAnyValue *pProtLocIndex = new CAnyValue ( );
    (*ppValObjs)->push_back (pProtLocIndex);
}
// LSPCnst.h
#ifndef_LSPCNST_H_
#define_LSPCNST_H_
// "ServerStatsTable" oids
#define szhlServerControlDataSrcOid           "1.3.6.1.4.1.43.31.1.6.1.2"   // read_write
#define szhlServerTimeMarkOid                 "1.3.6.1.4.1.43.31.1.7.1.1"
#define szhlServerAddressOid                  "1.3.6.1.4.1.43.31.1.7.1.2"
#define szhlServerDescrOid    "1.3.6.1.4.1.43.31.1.7.1.3"
#define szhlServerTypeOid                     "1.3.6.1.4.1.43.31.1.7.1.4"
#define szhlServerSiteNameOid  "1.3.6.1.4.1.43.31.1.7.1.5"
#define szhlServerHitsOid                     "1.3.6.1.4.1.43.31.1.7.1.6"
#define szhlServerByteRateMedianOid    "1.3.6.1.4.1.43.31.1.7.1.7"
#define szhlServerByteRateAverageOid   "1.3.6.1.4.1.43.31.1.7.1.8"
#define szhlServerByteRateMaxOid       "1.3.6.1.4.1.43.31.1.7.1.9"
#define szhlServerByteRateMinOid       "1.3.6.1.4.1.43.31.1.7.1.10"
#define szhlServerControlOwnerOid      "1.3.6.1.4.1.43.31.1.6.1.4"   // read_write
#define szhlServerControlStatusOid     "1.3.6.1.4.1.43.31.1.6.1.5"   // read_write
// "alResponseTable" OIDS
#define szhlResponseControlDataSrcOid         "1.3.6.1.4.1.43.31.1.2.1.2"   //read_write
#define szalResponseTimeTimeMarkOid            "1.3.6.1.4.1.43.31.1.4.1.1"
#define szalResponseTimeDestAddressOid        "1.3.6.1.4.1.43.31.1.4.1.2"
#define szalResponseTimeSourceAddressOid "1.3.6.1.4.1.43.31.1.4.1.3"
#define szalResponseTimeMedianOid             "1.3.6.1.4.1.43.31.1.4.1.4"
#define szalResponseTimeAverageOid             "1.3.6.1.4.1.43.31.1.4.1.5"
#define szalResponseTimeMaxOid                 "1.3.6.1.4.1.43.31.1.4.1.6"
#define szalResponseTimeMinOid                 "1.3.6.1.4.1.43.31.1.4.1.7"
#define szalResponseTimeBPSMedianOid          "1.3.6.1.4.1.43.31.1.4.1.8"
#define szalResponseTimeBPSAverageOid         "1.3.6.1.4.1.43.31.1.4.1.9"
#define szalResponseTimeBPSMaxOid              "1.3.6.1.4.1.43.31.1.4.1.10"
#define szalResponseTimeBPSMinOid              "1.3.6.1.4.1.43.31.1.4.1.11"
#define szhlResponseControlOwnerOid            "1.3.6.1.4.1.43.31.1.2.1.5"   //read_write
#define szhlResponseControlStatusOid           "1.3.6.1.4.1.43.31.1.2.1.6"   //read_write
#endif
```

Data retrieved from the query (or data retrieved from multiple separate queries) is correlated to determine specific network statistics (step 580). The network traffic statistics include any of bytes per second, number of packets, or any other denomination indicating the amount of traffic flowing through the network. The traffic volumes are categorized into traffic volume for each of hosts (host to host, for example), applications (traffic being generated by Internet Explorer, for example), application protocols (ftp traffic, for example), network protocols (TCP/IP, or UDP traffic, for example). At step 590, the correlated, data is output. The output can be in any form, displayed on a monitor, sent in an email, via pager, or other communication methods.

Figure 6:
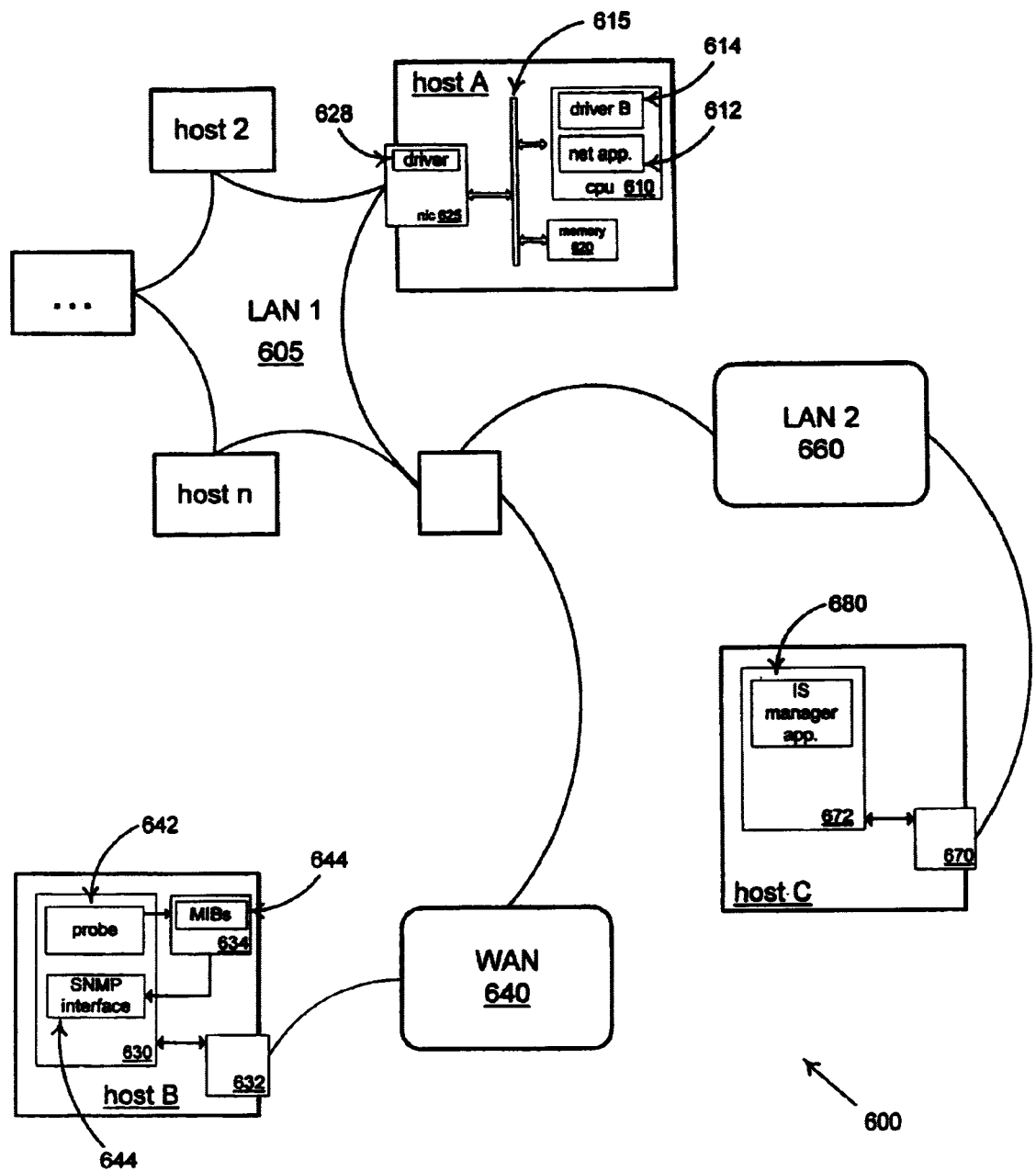
FIG. 6 is an example of a distributed RMON data capture device using agents operating in conjunction with Network Interface Consoles (or cards) and a correlating display device according to the present invention.

FIG. 6 is an example of a distributed RMON data capture device with correlation and display mechanisms according to one embodiment of the present invention. A network 600 is shown consisting of a collection of LANs (605, 660), and a WAN 640, each having one or more attached computing mechanisms. Host A is an example computing mechanism having a CPU 610, system bus 615, memory 620, and is connected to Network (or LAN) 605 via a NIC 625. An agent (or software driver) 614 collects statistics about network traffic passing through the NIC. The network statistics are collected on every packet. Alternatively, the agent may be configured to sample a selection of the packets transmitted. The network statistics are maintained in memory on the agent's host (Host A, memory 620, for example), but disk drive or other alternative storage techniques may also be utilized. Memory 620 is loaded with operating system applications and any number of end user applications, utility programs, data, etc., including applications using/creating network traffic (network app 612, or a protocol stack application, for example). The end user applications and utilities are loaded and executed in the CPU according to operating system control.

The agent 614 monitors both incoming and outgoing network traffic. Agent devices similar to agent 614 are installed on each monitored Host on any of the connected LAN's, WAN's, etc. of the network. The agents are aware of other monitored hosts on the network. When network traffic generated by a monitored host is received by another monitored host (monitored host to monitored host traffic), one of the agents disregards the traffic so that statistics for monitored host to monitored host traffic are not collected twice.

In the case where a monitored host is communicating with an unmonitored host, statistics are collected for all traffic. Statistics for network traffic between two unmonitored hosts are not collected.

Continuing with FIG. 6, host B includes a basic operating configuration having a configuration similar to host A, including CPU 630, NIC 632, and memory 634 (or other storage device). In addition, host B includes a software probe 642. In other embodiments, the probe device may be hardware based, perhaps residing on a single host or, be a stand alone device accessing the other hosts via a network connection to any of the LANs, WANS, or intermediary devices attached on the network. The probe retrieves the network statistics collected by each of the agents (by polling each of the monitored hosts having agents, or by receiving periodic messages—scheduled or based on events—from the agents on the monitored hosts). The probe then formats the retrieved statistics into MIB object format (MIBs), saving the MIB objects into memory 634. Alternatively, stored MIB objects are updated based on the retrieved network statistics. In yet another alternative the MIB objects are stored in a database, allowing a history of MIBs to be saved and retrievable. In one embodiment, memory storage maintains a most recent MIB, which is then rolled into the database on each MIB update cycle, or on a pre-determined periodic basis.

Many different arrangements of probes and collection procedures may be implemented. For a detailed discussion of other embodiments of monitoring NIC statistics, the reader is directed to Fletcher et al., U.S. Pat. No. 6,085,243, entitled "Distributed Remote Management (dRMON) for Networks," the contents of which are incorporated herein by reference, in their entirety.

Again, continuing with FIG. 6, the MIBs stored in memory 634 are exposed by an SNMP agent 646. Other types of interfaces may be utilized. The SNMP agent interface allows applications on other hosts to query the stored MIBs using SNMP gets as discussed above (see Table 4, for example). The SNMP interface reads the MIB objects and prepares responses to the queries. The query responses are sent back out to the requesting host via NIC 632.

Host C has a configuration similar to Host A and includes a NIC device 670 and CPU 672. The CPU 672 executes an IS manager application 680. The IS manager application 680 performs SNMP gets to retrieve data stored in the MIB objects 644. The data retrieved is from RMON standard MIBs and extension MIBs (see appendices A–C, for example). IS manager application 680 correlates the retrieved data to produce network statistics for display to the IS manager (user of the IS manager application) The display may include graphs, charts, image, or text outputs. The display may include selection criteria of various views of the networks data, and may include a search function to allow user searches of the data (see user interface description below). Alternatively, the display data may be formatted into an e-mail, pager or other data forms and sent to an address of a user or client of the IS manager application. Many other methods for retrieving and displaying the network statistics may be utilized. Several examples are disclosed in Grace et al., entitled "METHOD AND ARCHITECTURE FOR DISTRIBUTED WEB BASED NETWORK MANAGEMENT AND COMMUNICATIONS," application Ser. No. 09/653,789, filed Sep. 1, 2000, the contents of which are incorporated herein by reference, in their entirety.

The present inventors have realized that effective the display of the networks statistics to IS managers and other users is important in the overall concept of a network management tool.

Figure 7:
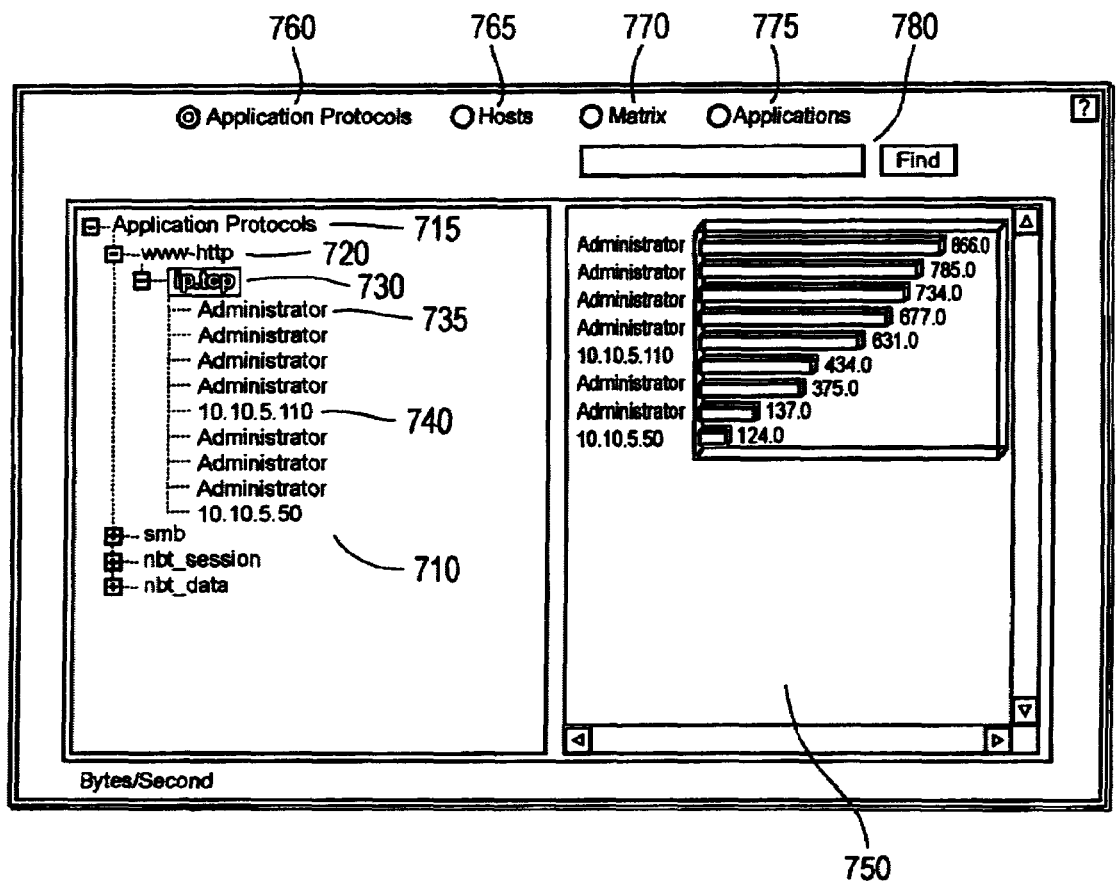
FIG. 7 is a screen shot of one embodiment of an Application Protocols user interface according to the present invention.

FIG. 7 is an example of one view of an embodiment of a display according to the present invention. A tree structure 710 is shown having application protocols 715 at a top level (root node) of the tree. The application protocols listed are the application protocols used to communicate between the various applications on a network (network 600, for example). For example application protocol www-http 720 may be utilized by a first browser application such as Internet Explorer on one host to communicate with an http web server on a different host. The node for application protocol www-http 720 also represents communications made by other browser applications (Internet Explorer, Netscape, etc.) to communicate with the same or different http web server. Other application protocols, that are shown for example purposes, include smb 722, nbt_session 724, and nbt_data 726, each node representing traffic from all monitored hosts using those protocols. Other application protocols utilized by any of the monitored hosts are identified and placed in the tree.

On a branch of the tree structure below each application protocol is a listing of network protocols. For example, network protocol ip.tcp 730 is shown under the http-www application protocol. The tree node for ip.tcp network protocol 730 represents all of the network traffic carrying http-www application protocol related packets using the ip.tcp network protocol. If other network protocols were in child brances of www-http, then all of the www-http would be dived between the other network protocols and ip.tcp. In this example, since ip.tcp is the only network protocol listed, ip.tcp packets carry all of the monitored network traffic carrying http-www related traffic.

On a branch of the tree structure below each network protocol is a listing of hosts (735, for example)(or addresses, 740, for example). Each listed host is using the immediately preceding network protocol to carry data related to the next immediately preceding application protocol. For example, Host Administrator 735 is running an application using the http-www application protocol, and is transporting packets containing http-www related data using the ip.tcp (TCP/IP) network protocol.

The tree structure 710 is selectable. When a user selects a branch (or node) in the tree structure 710 (via a single left click of a mouse or other pointing device, for example), a display side 750 of the split window display is populated with data regarding the children of the selected branch or node. In FIG. 7, the network protocol ip.tcp 730 is shown selected and the display side 750 is populated with the children (Hosts and IP addresses) along with data regarding the network traffic on each host using the ip.tcp network protocol and immediately preceding application protocol.

If the user selects the http-www 720 application protocol a listing of each network protocol along with network traffic data (again, in this embodiment, in bytes per second) for each network protocol. In this example, selection of the http-www 720 application protocol brings up the ip.tcp network protocol in the display side 750 with a bytes per second traffic data representing a summation of all bytes per second network traffic from each of the children hosts (including 735 and 740, for example). If the user selects the application protocols 715 (root node), the display side 750 is populated with each application protocol www-http, smb, nbt_session, and nbt_data along with the total bytes per second of network traffic for each respective application protocol.

FIG. 7 also includes an example arrangement for selecting various views of the network traffic. The view shown in FIG. 7 is an Application Protocols view as indicated by the Application Protocols radio box selection 760. Other radio box selections include views for Hosts 765, Matrix 770, and Applications 775. FIG. 7 also includes a Find Utility 780 that allows a user to search for specific network data (Host 10.10.5.110, or a specific protocol smb, for example), which determines (finds) a first instance of the item searched for in the tree hierarchy, expands the tree hierarchy to a level of the first instance item, highlights the first instance item, and displays data associated with the first instance item in the right hand side of the split window display. If the user presses find again, the process is repeated for the next instance, if found.

Figure 8:
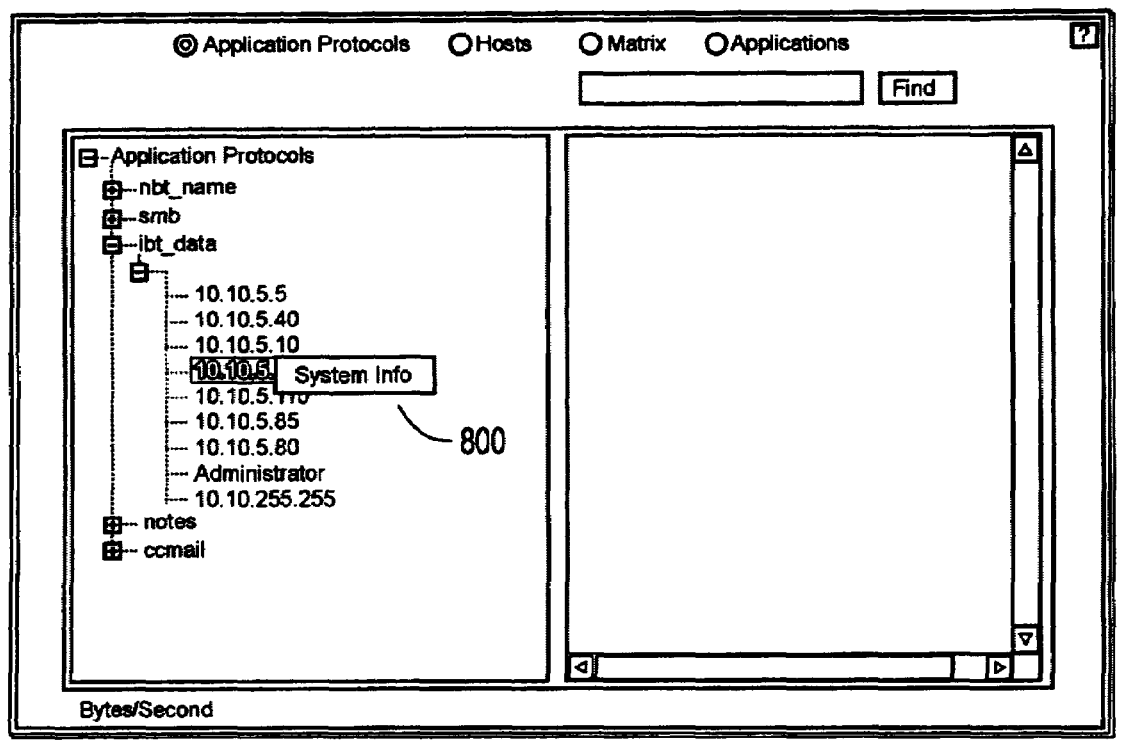
FIG. 8 is a screen shot of one embodiment of a system information invocation process according to the present invention.
Figure 9:
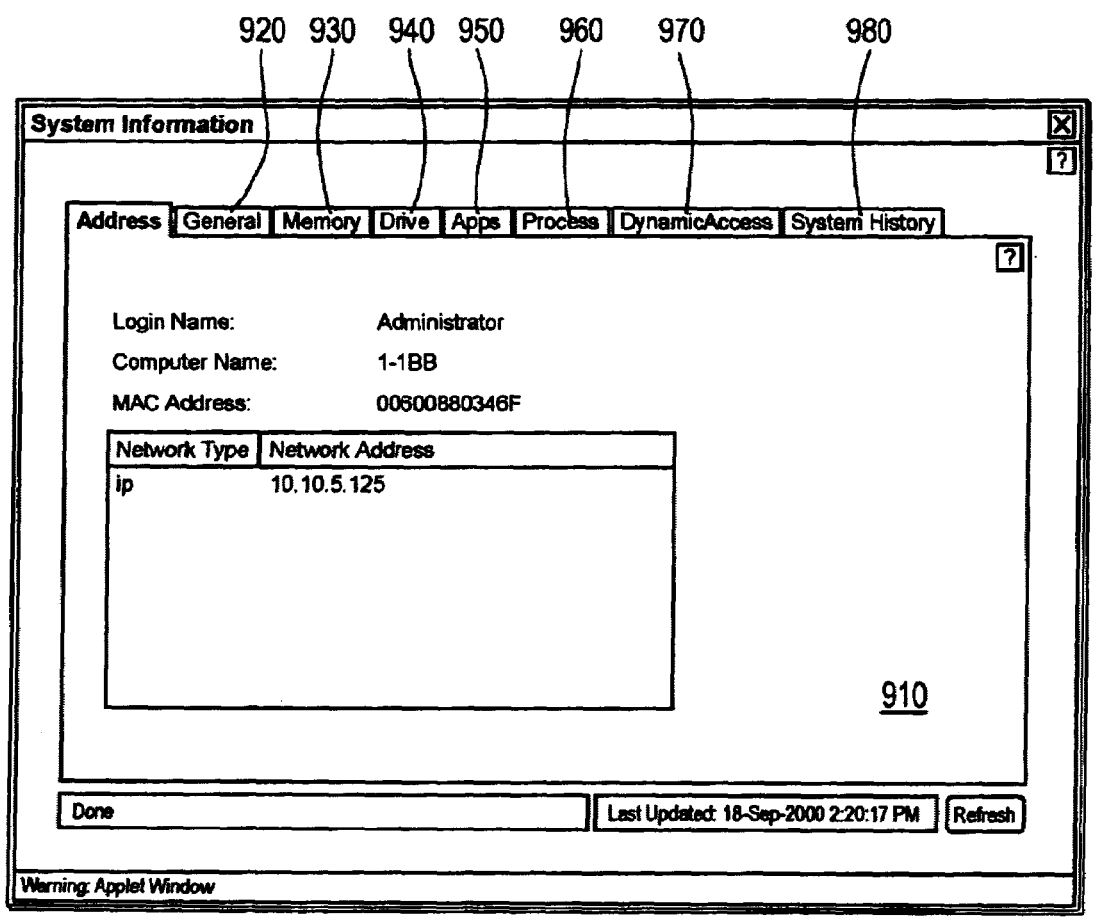
FIG. 9 is a screen shot of one embodiment of a system information display according to the present invention.

FIG. 8 illustrates one embodiment of a right click selection on a host. The host right click activates a pop-up menu having a system info 800 selection. FIG. 9 is a screen shot of a detailed system information screen 900 that is activated by selecting system info 800. The detailed system information screen 900 contains system information for the right clicked host, including, address information 910, general info 920 (which could be any useful information, including, but not limited to, OS type, OS version, CPU usage, processors (e.g., a multi-processor list box, including clock speeds), I/O busses, etc.), memory 930, drive 940 (local disk space), Apps 950 (applications loaded), Process 960 (listing processes running on the right clicked host), Dynamic Access 970 (containing versioning information of LAN agents running on the right clicked host), and System History 980 (including any of historical network traffic data, host maintenance records, etc).

Figure 10:
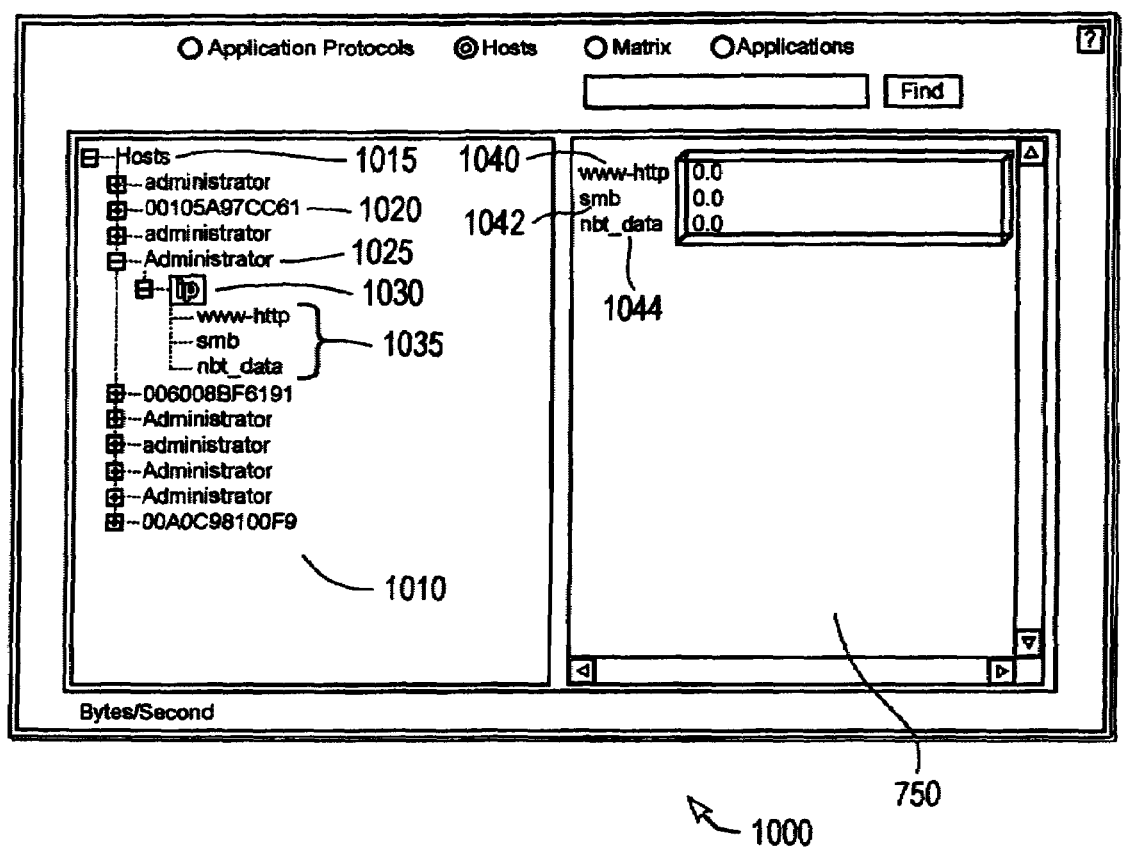
FIG. 10 is a screen shot of one embodiment of a Hosts user interface according to the present invention.

FIG. 10 is an example embodiment of a Hosts view 1000 according to the present invention. The hosts view includes a tree structure 1010 having a root node entitled hosts 1015. The children of the root node are the various hosts (00105A97CC61 1020, and Administrator 1025, for example). A level below the hosts are network protocols (ip 1030, or tcp/ip, for example). And, a level below the network protocol is application protocols 1035.

Again, selection of a specific node of the tree structure 1010 brings up a populated listing describing network traffic for children of the selected node in the display side 750. In this example, network protocol ip 1030 is selected, and display side 750 includes network traffic statistics (bytes per second) for each of the children application protocols (www-http 1040, smb 1042, and nbt_data 1044). In this embodiment, the network traffic statistics are shown as a bar graph indicating the number of bytes per second, however, other display methods may be used (graph, pie charts, etc). In this example, network statistics for the www-http application protocol indicate the number of bytes per second of www-http network data that is travelling the network using ip protocol (TCP/IP) and is either originating or being received by the Administrator host 1025.

Figure 11:
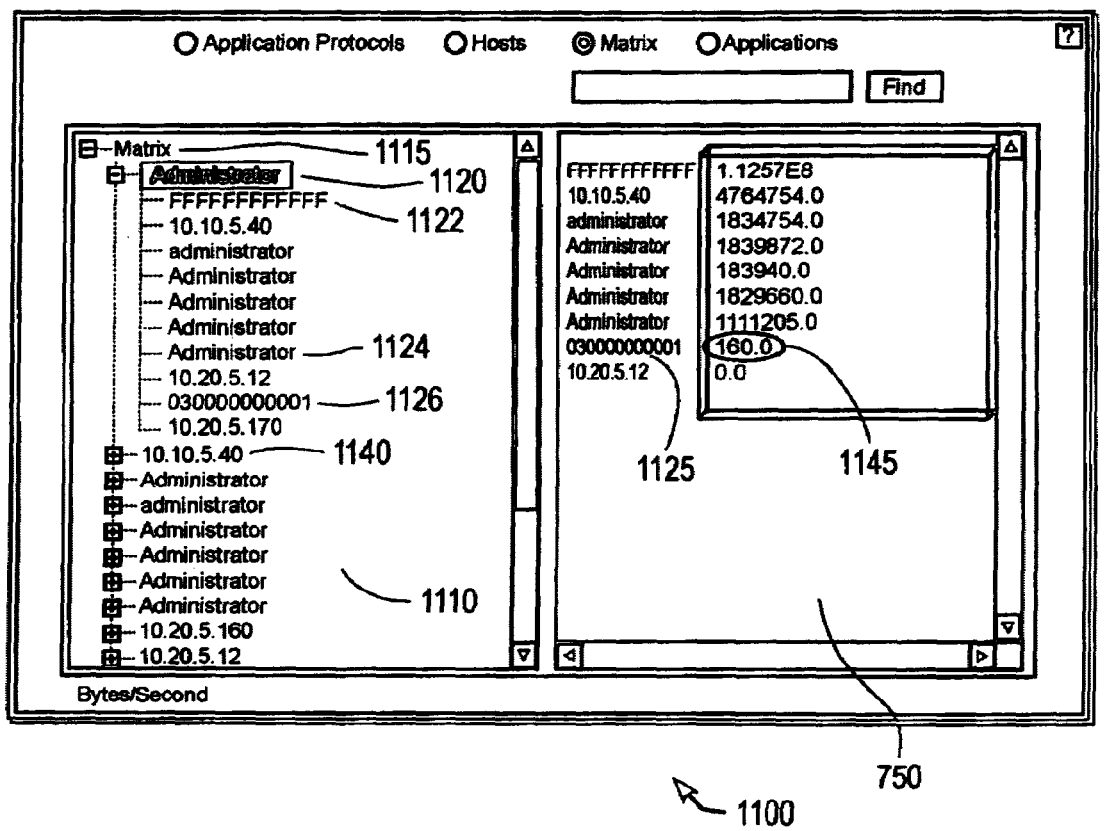
FIG. 11 is a screen shot of one embodiment of a Matrix user interface according to the present invention.

FIG. 11 is an example embodiment of a Matrix view 1100 according to the present invention. The Matrix view includes a tree structure 1110 having a root node entitled matrix 1115. The children of the root node are the various hosts (Administrator 1120 and 10.10.5.40 1140, for example). The Administrator Host 1120 is shown selected and having its children expanded (including children FFFFFFFFFFFF 1122, Administrator 1124, and 030000000001 1126, for example). These children are the hosts to which the immediately preceeding host (Administrator 1120) are communicating with using any of the previously mention application or network protocols.

The selected Host (Administrator 1120) brings up a populated network traffic data in display 750, which includes bytes per second for each of the matrixed hosts. Network statistic 1145 indicate an amount of netwrork traffic, in bytes per second, that are being communicated between host 030000000001 1126 and Administrator 1120 (an example matrixed hosts).

Figure 12:
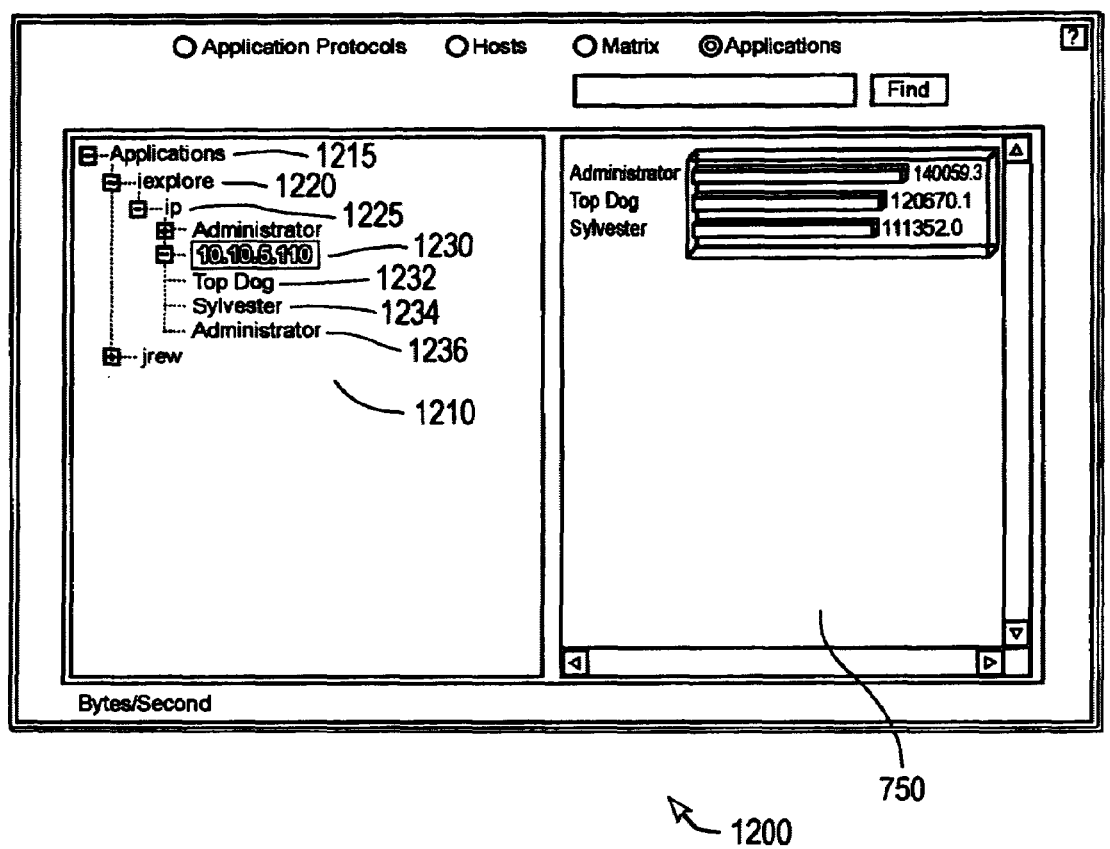
FIG. 12 is a screen shot of one embodiment of an Applications user interface according to the present invention.

FIG. 12 is an example embodiment of an Applications view 1200 according to the present invention. The Applications view includes a tree structure 1210 having a root node entitled Applications 1215. The children of the root node are the various applications running on any of the hosts attached to the network and which create network traffic (Internet Explorer, ICQ, Netscape, etc). Child iexplore 1220 (for Internet Explorer, for example) has network protocols as its children (ip 1225). Additional network protocol children under iexplorer would be shown if other network protocols were being utilized by any of the Internet Explorer applications on the network. For example, if a user performs an ftp operation using Internet Explorer, an ftp child would also be shown.

Children of the network protocols are the hosts that are executing the application. For example, host 10.10.5.110 1230, starting with the application, is executing at least one Internet Explorer application, which is creating ip traffic. Host 10.10.5.110 1230 is shown selected and network traffic statistics for its children are shown in the display side 750.

Children of the hosts, in this view, are hosts that are talking to the the immediately preceding host. In this example host 10.10.5.110 1230 has children Administrator 1232, Top Dog 1234, and Sylvester 2000 1236, each representing different machines talking to 10.10.5.110 via IE over ip.

Every host listed herein may be displayed or identified via any of username (or logon id), machine name, network address (preferrably IP address, or, if the IP address is not available, other addresses, ipx, for example), and MAC address. The actual host listing depends on whether a LAN agent is present on the host, and whether a user is logged in. If a LAN agent is not present, only the Network address (from RMON2 table) or MAC address (from the RMON1 table), in that order, are provided. With an agent present, if the user is logged on, the username(login id) is used, otherwise, the machine name is displayed.

In the above description, the network traffic data is provided in bytes per second. Other metrics for displaying the network traffic may be utilized (number of packets per predetermined time period, seconds, for example). In addition, a length of time for which data is collected to produce the bytes per second statistics can be any preset or varying length of time. However, it is envisioned that the present invention provide a snapshot of network performance at or near the time the statistics are viewed by a user. Therefore, the statistics are preferably updated in at least near real-time. In one embodiment, the snapshot represents traffic for the last 2 minutes. In addition, an age-out factor may be set such that hosts applications, or protocols that do not produce any traffic over a predetermined period of time (24 hours, for example) will not be shown. Finally, a pre-selected number of hosts, usernames, or protocols in the various views of the present invention may be implemented, for example, displaying only the top 50, or top 25 hosts. Alternatively, all of the hosts, usernames, or protocols are displayed.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, microdrive, and magneto-optical disks, ROMs, RAMs, EPROMs, EEPROMs, DRAMs, VRAMs, flash memory devices (including flash cards), magnetic or optical cards, nanosystems (including molecular memory Ics), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, programs for remote and local monitoring of network traffic, programs for collecting, compiling, and storing network statistics, programs for referencing and correlating the stored network statistics into the specific network traffic data and tree hierarchies described herein, and the display, storage, or communication of results according to the processes of the present invention.

Figure 1:
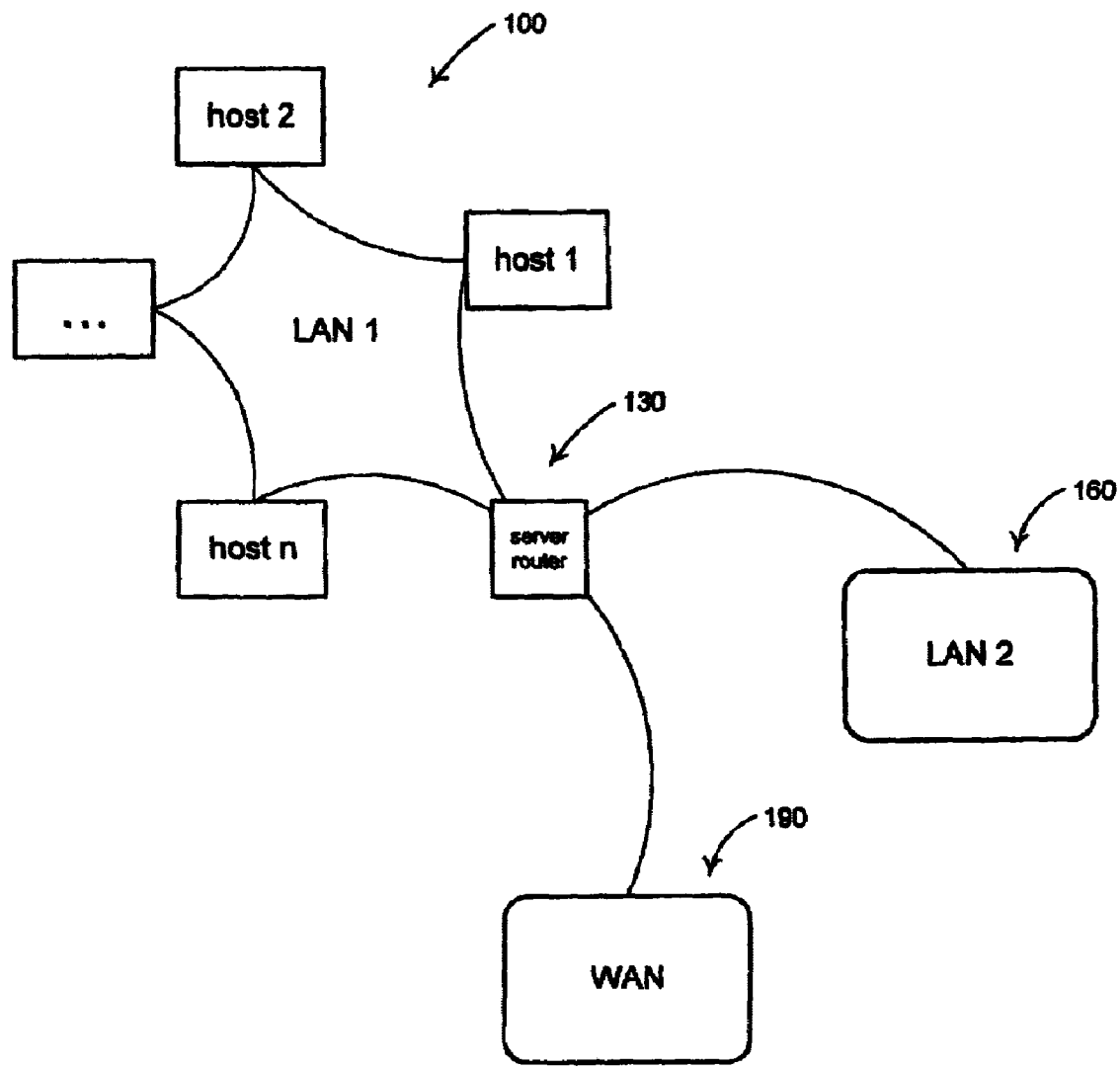
FIG. 1 is a diagram representing a typical modern LAN 100 comprised of one to many Hosts or End Systems (ESs) hosts.

For purposes of clarity, the present discussion refers to network devices and concepts in terms of specific examples. However, the method and apparatus of the present invention may operate with a wide variety of types of network devices including networks and communication systems dramatically different from the specific examples illustrated in FIG. 1 and described herein. Another specific example, such as in reference to applications like Internet Explorer it should be readily apparent that many other applications using network communications may be substituted. It should also be understood that while the invention is described in terms of a computer network, the invention has applications in a variety of communication systems, such as advanced cable television systems, advanced telephone networks, ATM, or any other communication system that would benefit from performance monitoring via correlation of data from data pools such as MIBs and/or the display of results from that monitoring. It is therefore not intended that invention be limited, except as indicated by the appended claims. It is intended that the word "network" as used in the specification and claims be read to cover any communication system unless the context requires otherwise and likewise "end system" and "node" be read to encompass any suitable end system (telephone, television) on any such communication system or to encompass distributed points in the network intermediate of an end systems. It is also intended that the word "packet" as used in the specification and claims be read to cover any unit of transmitted data, whether an ethernet packet, a cell, or any other data unit transmitted on a network unless the context requires otherwise.

Obviously, numerous modifications and variations of the present invention are possible in light of the above teachings. It is therefore to be understood that within the scope of the appended claims, the invention may be practiced otherwise than as specifically described herein.

The attached appendices are for exemplary purposes of an implementation of proprietary MIBs according to the present invention. The MIBs are not intended as working MIBs, but as an example of how the invention may be implemented. No statements, structures, codes, or comments contained herein shouod be viewed as a limitation on the present invention, unless specifically stated so in the appended claims.

What is claimed as new and desired by Letters Patent of the United States is:

1. A method of correlating and presenting network data, comprising the steps of:
   retrieving a set of data from a network statistic data pool, said data pool having network traffic information for at least one of Applications, Application Protocols, Network Protocols, Hosts, and users on the network;
   correlating the retrieved data into a map of traffic on said network; and
   outputting said map;
   wherein:
   said map is output in a tree-based hierarchy in a split-window display; and
   said tree-based hierarchy is switchable within the split-window display between each of,
   an Applications view comprising a hierarchy of network traffic flow for each application currently running on said hosts, further comprising a tree of applications protocol roots expandable to highlight network protocol branches used on the network in conjunction with the expanded application protocol root in a first window of the split-window display, and performance data as to each host pertaining to a selected application protocol and network protocol root branch pair in a second window of the split-window display,
   an Application Protocols view comprising a hierarchy of network traffic for each application protocol running on said hosts,
   a Hosts view comprising a hierarchy of network traffic for each of said hosts, and
   a Matrix view comprising a hierarchy of host to host network traffic on said network for each of said hosts.

2. The method according to claim 1, wherein:
   said network statistic data pool is a set of RMON standard MIB objects, and said step of retrieving comprises:
   querying the network statistic data pool for RMON standard MIB data;

querying the network statistic data pool for RMON extension MIB data not available in standardized MIBs and also needed in said set of data to produce said map; and combining the RMON standard MIB and RMON extension MIB data into said data set.

3. The method according to claim 1, wherein said network statistic data pool comprises a set of data placed in at least one of RMON standard and RMON extension MIBs.

4. The method according to claim 1, wherein said step of outputting comprises:

providing each of said Applications, Application Protocols, Hosts, and Matrix views in individual displays; and displaying a selection mechanism that, identifies and allows selection of one of said views, and toggles to a selected one of said maps.

5. A method of presenting network data, comprising the step of:

retrieving network data; and displaying the network data in a split-window display;

wherein said step of displaying includes the steps of:

displaying high level portions of the network data in a selectable format in a first window of said split-window display; and displaying details of a high level portion of network data selected in said first window in a second window of said split-window display; and the steps of displaying include displaying a Hosts view comprising a tree of host roots expandable to highlight network protocols utilized by each root host in a first window of the split-window display, and performance data as to each applications protocol operating under a selected host network protocol root branch pair in a second window of the split-window display; wherein the steps of displaying comprise displaying an Application view comprising a tree of Application roots expandable to highlight root network protocols expandable to highlight hosts utilizing the root network protocol in conjunction with the expanded root Application in a first window of the split-window display, and performance data related to each application of a selected host, network protocol, and host combination in a second window of the split-window display.

6. The method according to claim 5, further comprising the step of:

switching between various views of the displayed high level portions and details based on a user input criteria.

7. The method according to 6, wherein said user input criteria is a radio box having selections for each view.

8. The method according to claim 6, wherein said user input criteria includes indications for each of Application Protocols, Hosts, Matrix, Applications views of the network data.

9. The method according to claim 5, further comprising the steps of:

retrieving user specified data;

searching said network data for any of the user specified data; and displaying any network data matching the user specified data.

10. The method according to claim 9, wherein said user specified data is any of an Application Protocol, Application, Network Protocol, Host Name, and user name.

11. The method according to claim 5, wherein said high level details comprises any of Application Protocols, Applications, Network Protocols, Hosts, and users of said network.

12. The method according to claim 5, wherein said details is at least one of number of packets transmitted, bytes per second or other network data statistic.

13. The method according to claim 5, wherein said details comprises bytes per second of network traffic.

14. The method according to claim 5, wherein said details include a chart indicating an amount of network traffic associated with the selected portion.

15. The method according to claim 5, wherein said step of displaying includes the step of displaying high level portion of said network data in a tree format in a first window of said split-window display.

16. The method according to claim 15, wherein said tree format is a branch expandable/collapsible tree format.

17. The method according to claim 15, wherein:

a top level of said tree format contain Application Protocols;

a second level of said tree format contains Network Protocols; and a third level of said tree format contains Host identifiers.

18. The method according to claim 15, wherein:

a top level of said tree format contains Hosts connected to said network;

a second level of said tree format contains Network protocols associated with the hosts in said top level; and a third level of said tree format contains Application protocols associated with the network protocols in said second level.

19. The method according to claim 15 wherein:

a top level of said tree format contains Host Data; and a second level of said tree format contains hosts having conversations with the Hosts at the top level;

wherein the hosts are identified by any one of usernames (logon ids), machine names, network addresses, and MAC addresses.

20. The method according to claim 17, wherein:

a top level of said tree format contains identifications of Applications resident on a Host of said network;

a second level of said tree format contains Network Protocols; and a third level of said tree format contains any of User Names, machine names, and network addresses on said network running the Applications identified in said second level.

21. The method according to claim 11, wherein said Hosts are identified by at least one of usernames (login ids) machine names, network addresses, and MAC addresses, in that order.

22. A method of presenting network data, comprising the step of:

retrieving network data;

displaying the network data in a split-window display;

displaying a high level hierarchy of the network data in a first side of the split-window display;

selecting one of the network data; and displaying performance data related to the selected network data in a second side of the split-window display.

23. The method according to claim 22, wherein:

the step of displaying a high-level hierarchy comprises, displaying a listing of applications running on the network, and, for each application, displaying protocols used by the application, and hosts executing the application in an expandable tree format such that each application contains at least one protocol branch, and each protocol contains at least one host executing the application;

the step of selecting comprises selecting at least one of the hosts, under a specific protocol of an application; and the step of displaying performance data comprises displaying data related to network performance as to each of the applications running on the selected host using the specific protocol.

24. The method according to claim 22, wherein:

the step of displaying a high-level hierarchy comprises a listing of root hosts communicating over the network displayed in an expandable tree format such that each root host contains at least one branch containing a host communicating with the root host;

the step of selecting comprises selecting at least one of the root hosts; and the step of displaying performance data comprises displaying data related to network performance as to each of the branch hosts communicating with the selected root host.

25. The method according to claim 24, wherein the performance data includes a set of combined horizontal bar graph and network statistic each indicating communication performance of one of the branch hosts with the root host.

26. The method according to claim 22, wherein:

the step of displaying a high-level hierarchy comprises, displaying a listing of hosts operating on the network, and, for each host, displaying network protocols used on host, and displaying application protocols utilized in conjunction with each network protocol, the hosts and protocols being displayed in an expandable tree format such that each host contains at least one network protocol branch, and each network protocol contains at least one application protocol branch;

the step of selecting comprises selecting at least one of the network protocols under a host; and the step of displaying performance data comprises displaying data related to network performance as to each of the application protocols of the selected network protocols.

27. The method according to claim 22, wherein:

the step of displaying a high-level hierarchy comprises, displaying a listing of application protocols utilized by applications running on hosts of the network, and, for each application protocol, displaying network protocols utilized by each application protocol, and displaying the hosts running applications using the application protocol and network protocols over the network, the hosts and protocols being displayed in an expandable tree format such that each application protocol is a root having a first level of branches comprising the each network protocols, and a second level of branches comprising each host;

the step of selecting comprises selecting at least one of the network protocols under an application protocol; and the step of displaying performance data comprises displaying data related to network performance as to each of the hosts as to the root application protocol of the selected network protocols.

28. The method according to claim 22, wherein:

the steps of displaying a high-level hierarchy and displaying performance data comprise a set of selectable views, comprising, an Applications Protocols view comprising a tree of applications protocol roots expandable to highlight network protocol branches used on the network in conjunction with the expanded application protocol root in a first window of the split-window display, and performance data as to each host as it pertains to a selected application protocol and network protocol root branch pair in a second window of the split-window display;

a Hosts view comprising a tree of host roots expandable to highlight network protocols utilized by each root host in a first window of the split-window display, and performance data as to each applications protocol operating under a selected host network protocol root branch pair in a second window of the split-window display;

a Matrix view comprising a tree of host roots expandable to highlight other hosts communicating with the root host in a first window of the split-window display, and performance data as to each host communicating with a selected root host in a second window of the split-window display; and the Application view.

* * * * *